US006810597B2

United States Patent
Grzesiak et al.

(10) Patent No.: US 6,810,597 B2
(45) Date of Patent: Nov. 2, 2004

(54) USE OF SURFACE MEASURING PROBES

(75) Inventors: Jean-Louis Grzesiak, Bristol (GB); Alexander Tennant Sutherland, Edinburgh (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 10/632,868

(22) Filed: Aug. 4, 2003

(65) Prior Publication Data

US 2004/0055170 A1 Mar. 25, 2004

Related U.S. Application Data

(63) Continuation-in-part of application No. 10/191,460, filed on Jul. 10, 2002, now Pat. No. 6,601,311, which is a continuation of application No. 09/701,735, filed as application No. PCT/GB00/01315 on Apr. 7, 2000, now Pat. No. 6,434,846.

(30) Foreign Application Priority Data

Apr. 8, 1999 (GB) .............................................. 9907868

(51) Int. Cl.[7] .............................................. G01B 5/004
(52) U.S. Cl. .............................. 33/503; 33/556; 702/168
(58) Field of Search .......................... 33/502–504, 556, 33/559; 702/95, 168

(56) References Cited

U.S. PATENT DOCUMENTS

| 3,986,007 | A | | 10/1976 | Ruoff, Jr. | |
|---|---|---|---|---|---|
| 4,523,450 | A | | 6/1985 | Herzog | |
| 4,939,678 | A | | 7/1990 | Beckwith, Jr. | |
| 4,991,304 | A | * | 2/1991 | McMurtry | 33/504 |
| 5,214,857 | A | | 6/1993 | McMurtry et al. | |
| 5,501,096 | A | | 3/1996 | Stettner et al. | |
| 5,594,668 | A | | 1/1997 | Bernhardt et al. | |
| 5,726,917 | A | * | 3/1998 | Staaden | 702/168 |
| 5,737,244 | A | * | 4/1998 | Ruck | 33/503 |
| 6,161,079 | A | | 12/2000 | Zink et al. | |
| 6,434,846 | B1 | | 8/2002 | McMurtry et al. | |
| 6,568,242 | B2 | * | 5/2003 | Nai | 33/502 |
| 6,601,311 | B2 | * | 8/2003 | McMurtry et al. | 702/95 |

FOREIGN PATENT DOCUMENTS

| EP | 0 318 557 | 6/1989 |
|---|---|---|
| EP | 0 599 513 A | 6/1994 |
| WO | WO88/09915 | 12/1988 |

* cited by examiner

Primary Examiner—G. Bradley Bennett
(74) Attorney, Agent, or Firm—Oliff & Berridge, PLC

(57) ABSTRACT

A method of measuring an artefact 5 using a machine 2 on which a measuring probe 6 is mounted. The probe is brought into contact with the artefact and movement continued for a limited distance to deflect the stylus 7. The machine and probe outputs are recorded whilst the probe is free and when the stylus is deflected. A model of the probe and CMM outputs during both contact and non-contact between the probe and artefact is fitted to the data to allow the contact position when the stylus contacts the artefact with zero force to be determined. The probe outputs may be fitted to the model individually to determine a single contact position. By using data during movement of the probe towards and away from the artefact, errors due to time delays may be corrected.

40 Claims, 9 Drawing Sheets

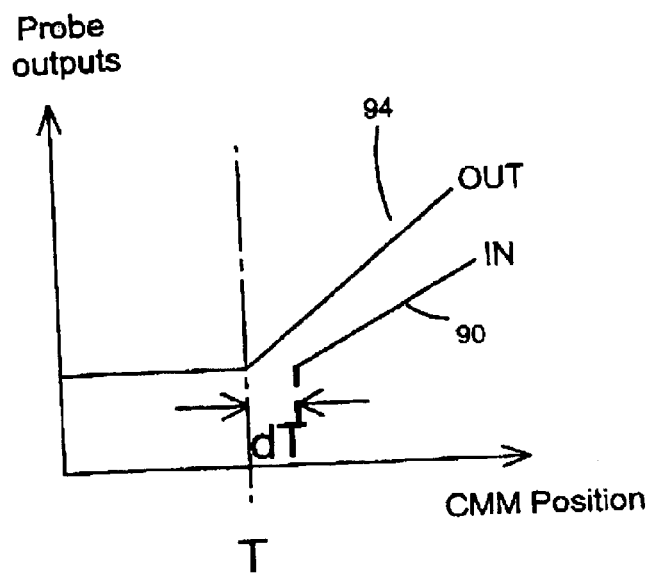
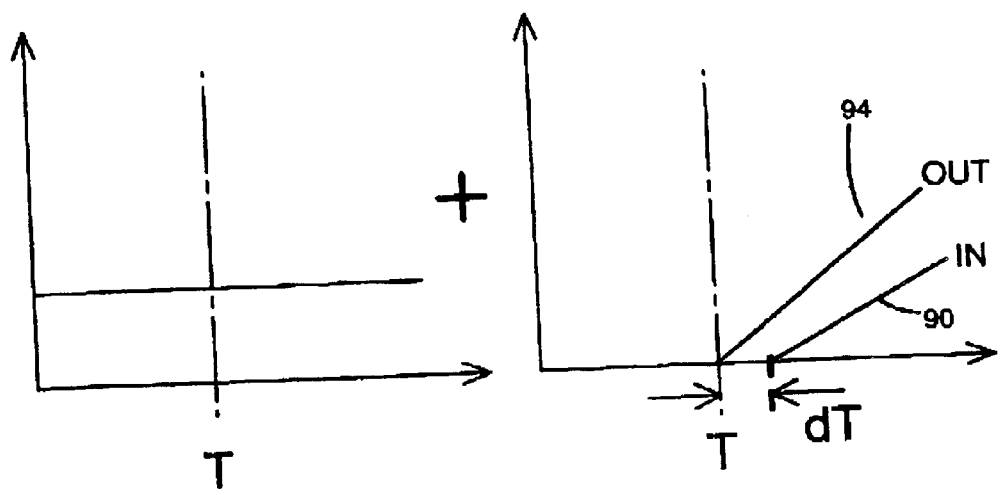
Fig 11

USE OF SURFACE MEASURING PROBES

CROSS REFERENCE TO RELATED APPLICATIONS

This is a continuation-in-part of U.S. patent application Ser. No. 10/191,460 filed on 10 Jul. 2002, now U.S. Pat. No. 6,601,311 which is a continuation of U.S. patent application Ser. No. 09/701,735 filed on 4 Dec. 2000, now U.S. Pat. No. 6,434,846 which is the National Stage of PCT/GB00/01315 filed on 7 Apr. 2000, which are incorporated herein by reference.

BACKGROUND OF THE INVENTION

The present invention relates to the measurement of workpieces using a surface measuring probe.

Measurement probes are known which have a stylus which is deflectable when acted upon by a force as a result of contact between the stylus and the surface of an object. One or more transducers within the probe measure the deflection of the stylus (usually in three orthogonal coordinate directions) in order to obtain information about the position of the surface. In use, such a probe is mounted in a machine such as a coordinate measuring machine (CMM), machine tool, measuring robot or other coordinate positioning apparatus. The machine moves the probe around the object to be measured. Measuring devices in the machine give outputs relating to the position of the probe, which when combined with the outputs from the probe itself enable information to be obtained about the size, shape, position, surface contours, etc of the object.

Such a measuring probe may be referred to as an "analogue probe", distinguishing the measurement outputs of its transducers from probes which merely produce a trigger signal upon contact with an object. The term "scanning probe" may also be used, since such probes are often used for scanning the surface contour of an object. Even though the term "analogue probe" may be used, the outputs of the transducers may in fact be analogue or digital.

In known systems, measurement errors are caused by deflections of the probe and machine structure. For example, when the stylus is deflected, it is de-biased towards a zero position e.g. by springs, and these forces cause bending of the probe stylus and of structural components of the machine. Whilst small, such deflections can nevertheless affect the accuracy of measurement, in view of the extremely high accuracies nowadays demanded.

Our earlier International Patent Application WO92/20996 describes a method of measurement in which such a probe is moved into contact with the surface of an object to be measured, and the movement is continued for a further limited distance after initial contact has been made. During this movement, the outputs of the measuring devices of the machine and the transducers of the probe are simultaneously recorded at a plurality of instants. These recorded outputs are then used to compute, by extrapolation, the values of the outputs of the measuring devices of the machine which were existing at the instant that the probe stylus was in a state of zero deflection and still in contact with the surface.

This method allows an analogue probe to be used as if it were a very accurate touch trigger probe since the value of the machine's outputs is determined at the point where the stylus contacts the surface, in the same way as a trigger probe. The higher accuracy of this method derives partly from the fact that many data points are taken in order to determine the point of contact, so that errors tend to be averaged out. Furthermore, a particular advantage is that the contact point determined corresponds to zero deflection of the stylus, and consequently zero contact force between the stylus and the object, so that errors due to bending of the stylus and/or of the machine structure do not arise.

SUMMARY OF THE INVENTION

A first aspect of the present invention provides a method of measuring an artefact using a machine on which a measuring probe is mounted for relative movement with respect to the artefact, said machine having at least one measuring device for providing an output indicative of the relative position of the probe, the probe having a deflectable stylus, and at least one measuring device for measuring deflections of the stylus to provide one or more probe outputs which are indicative of the amount of deflection of the stylus from a rest position, the method being characterized by the steps of:

causing relative movement between the probe and artefact to bring the stylus into contact with the surface of an artefact and continuing said movement for a limited distance after initial contact has been made between the stylus and the artefact;

recording the outputs of the machine and of the probe at a plurality of instants, during both the periods of contact and non contact between the stylus and the artefact;

providing a model of the probe and CMM outputs which models the outputs both during contact and non contact between the stylus and the artefact;

fitting the model to the data and thereby determining the values of the outputs of the measuring device or devices of the machine relating to the contact position at which the stylus contacts the artefact with zero contact force; and combining said outputs of the measuring device or devices of the machine at said contact position with the probe deflection at the contact instant to establish the contact position at zero force.

The outputs of the measuring devices of the machine and the probe may be recorded during one or both of the probes relative movement towards the artefact and away from the artefact.

Preferably the model is a break line. The break line may comprise a line of zero gradient and at least one sloped line.

Preferably the values of the outputs of the machine when the stylus contacts the artefact with zero contact force are determined by an optimisation procedure.

A second aspect of the present invention provides a method of measuring an artefact using a machine on which a measuring probe is mounted for relative movement with respect to the artefact, said machine having at least one measuring device for providing an output indicative of the relative position of the probe, the probe having a deflectable stylus and at least one measuring device for measuring deflections of the stylus to provide two or more probe outputs which are indicative of the amount of deflection of the stylus from a rest position along at least two probe axes, the method including the steps of:

causing relative movement between the probe and artefact to bring the stylus into contact with the artefact and continuing said movement for a limited distance after initial contact has been made between the stylus and the artefact;

recording the outputs of the machine and of the probe at a plurality of instants, in at least part of the period of contact between the stylus and the artefact;

from said outputs of the machine and of the probe, determining the values of the outputs of the machine relating to the contact position when the stylus contacts the artefact with zero contact force;

wherein the data from each probe output is used individually to determine a single contact position.

A third aspect of the present invention provides a method of measuring an artefact using a machine on which a measuring probe is mounted for relative movement with respect to the artefact, said machine having at least one measuring device for providing an output indicative of the relative position of the probe, the probe having a deflectable stylus and at least one measuring device for measuring deflections of the stylus to provide one or more probe outputs which are indicative of the amount of deflection of the stylus from a rest position, the method including the steps of:

causing relative movement between the probe and the artefact to bring the stylus into contact with the artefact and continuing said movement for a limited distance after initial contact has been made between the stylus and the artefact;

recording the outputs of the machine and of the probe at a plurality of instants, in at least part of the period of contact between the stylus and the artefact, both for relative movement between the probe and artefact towards and away from one another;

from said outputs of the machine and of the probe, determining the values of the outputs of the machine relating to the contact position when the stylus contacts the artefact with zero contact force, both for relative movement between the probe and artefact towards and away from one another, thereby determining two apparent contact positions;

and wherein the true contact position is determined by combining the two apparent contact positions.

The true contact position is thereby corrected for time delays.

The combination of the two apparent contact positions may comprise taking an average of the two apparent contact positions.

The average may be weighted by the relative speeds of the machine during the relative movement between the probe and the artefact in each direction.

A fourth aspect of the invention comprises a method of measuring an artefact using a machine on which a measuring probe is mounted for relative movement with respect to the artefact, said machine having at least one measuring device for providing an output indicative of the relative position of the probe, the probe having at least one measuring device for measuring the distance from a surface of the artefact to provide one or more probe outputs, the method including the steps of:

causing relative movement between the probe and the artefact;

recording the outputs of the machine and of the probe at a plurality of instants, both for relative movement between the probe and artefact towards and away from one another;

from said outputs of the machine and of the:probe, determining two apparent surface positions of a surface of the artefact, the two apparent surface positions relating to relative movement between the probe and artefact towards and away from one another respectively;

and wherein the true surface position is determined by combining the two apparent surface positions.

The true contact position is thereby corrected for time delays.

The combination of the two apparent surface positions may comprise taking an average of the two apparent surface positions.

The average may be weighted by the relative speeds of the machine during the relative movement in between the probe and artefact in each direction.

BRIEF DESCRIPTION OF THE DRAWINGS

The invention will now be more particularly described, by way of example only, with reference to the accompanying drawings in which:

FIG. 11 illustrates the break line model with a time delay line added; and

DESCRIPTION OF PREFERRED EMBODIMENTS

Figure 1:
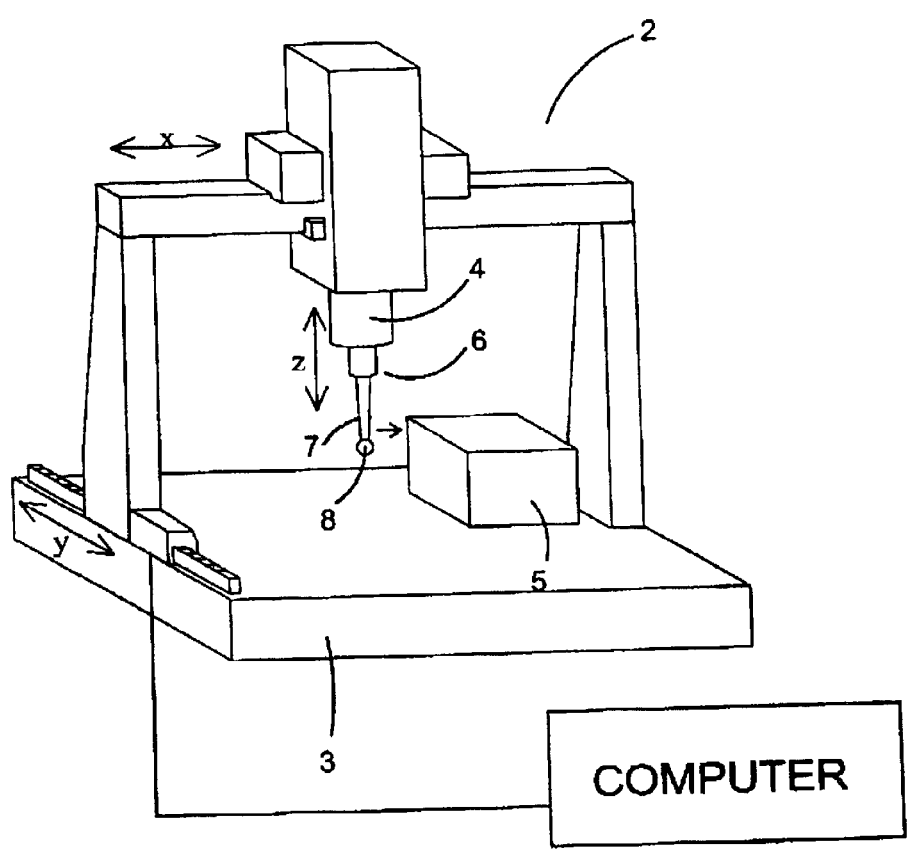
FIG. 1 is a diagrammatic representation of a CMM with which the invention is used.

A known method of using a scanning probe to take touch trigger measurements of a surface will now be described with reference to FIGS. 1 and 2. Referring to the drawings, FIG. 1 shows a coordinate measuring machine (CMM) 2 which is well known in the art. The CMM 2 has a machine table 3 on which an object 5 to be measured is mounted and a spindle 4 which is moveable in X, Y and Z relative to the machine table 3. Transducers (not shown) are provided to measure the relative position of the spindle with respect to the machine table in X, Y and Z. Variations of this set up are known in which relative motion between the object and the probe are provided by other means, for example by moving the object whilst the probe remains stationary.

A probe 6 is mounted on the spindle 4 of the CMM 2. The probe 6 has a deflectable stylus 7 with a workpiece contacting tip 8. Transducers are provided in the probe to measure the deflection of the stylus. An example of such a probe is described in U.S. Pat. No. 3,876,799 in which a stylus is supported relative to a fixed structure by three serially connected parallel springs. Displacement of the stylus relative to the fixed structure is transduced by optical means, comprising three optical scales provided on a member to which the stylus is connected and corresponding readheads located on the fixed structure adjacent the optical scales.

The probe is driven by the machine controller towards the object. During this movement the readings of the CMM transducers are continuously fed into a computer which forms part of the overall machine control system.

Whilst the stylus is in its rest position (i.e. the position which it occupies when no external forces act on the stylus tip), the output of the probe transducers is set to zero.

As soon as the stylus tip is deflected by contact with the object, the output of the probe transducers starts to change. This causes a signal to be sent to the machine controller (in known manner) to commence reading the machine scales and to output the values to the computer. A further limited amount of travel of the machine is allowed by the computer and then the machine is stopped and reversed. During the reversing movement, the outputs of the machine transducers and of the probe transducers are recorded simultaneously at intervals. The controller stops the machine and the computer calculates from the readings a notional straight line through the readings and extrapolates back to find the reading of each of the machine scales which would have existed at the very instant the stylus ball contacted the surface. This is the reading of each of the machine scales at the point when the output of the probe transducers was last at the level equating to the rest position of the stylus, FIG. 2 shows by a graphical representation the calculations which are made by the machine's computer. The vertical axis shown-represents the outputs of the probe transducers and the horizontal axis represents the CMM transducer outputs of one axis. As the machine continues its limited movement after contact has been made between the probe stylus and surface, the probe outputs increases as the stylus is deflected. A straight line 10 is plotted from the probe outputs and extrapolated back to find the machine scale readings at the probe output representative of zero. At this point 12, the probe stylus has zero deflection and thus there is zero force between the stylus and the object.

This method has several disadvantages. Firstly, the probe outputs may have offsets resulting in the transducers of the probe not reading zero when the stylus is in its rest position. This has the result that the extrapolation calculation finds the position of the CMM at the measured zero deflection rather than the position of the CMM at the contact point.

A second disadvantage is the uncertainty associated with the use of extrapolation. When a line is fitted, the uncertainty of an extrapolated point, which is outside the area of the measured points, is larger than the uncertainty of a point in the middle of the measured data.

Figure 3:
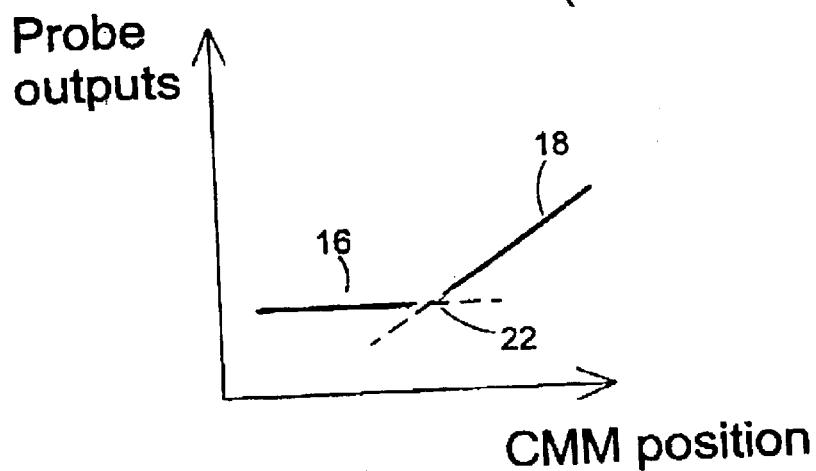
FIG. 3 is a graph of probe output against CMM position for a first embodiment of the present invention.

A first embodiment of the present invention will now be described with reference to FIG. 3. As described above, the probe is driven by the machine controller towards the object and during this movement the readings of the CMM transducers are constantly fed into the computer. As before, once the stylus tip is deflected by contact with the object, the probe travels a further limited distance and then is stopped and reversed. During movement in either the forward, reverse or both directions, the outputs of the machine transducers and of the probe transducers are recorded simultaneously and stored. However, in this embodiment the probe outputs are also recorded whilst the probe is free (i.e. not in contact with the surface of the object). Whilst the probe is free, the probe outputs are constant (except for noise). However, due to offsets, the probe outputs when the probe is free may not be zero. In FIG. 3, line 16 illustrates the probe outputs when the probe is free. When the stylus is in contact with the surface of the object, the probe outputs change with CM position as the stylus is deflected. Line 18 is a best fit line through these points.

The point 22 at which these two lines 16 and 18 intersect is the point at which the stylus tip of the probe first contacts the surface.

This method has the advantage that it allows for the probe offsets when the probe is free, unlike the prior art method in which the probe data is extrapolated back to zero deflection.

In a second embodiment of the present invention, the probe output data and CMM transducer data is fitted to a model which describes the reality more closely, as described in more detail below.

As before, the probe is driven by the machine controller towards the object and once the stylus tip is deflected by contact with the object, the probe travels a further limited distance and then is stopped and reversed. Both the CMM transducer outputs and the probe outputs are recorded continuously (i.e. whilst the probe is free and in contact with the object) and on both the forward or reverse movement.

Figure 4:
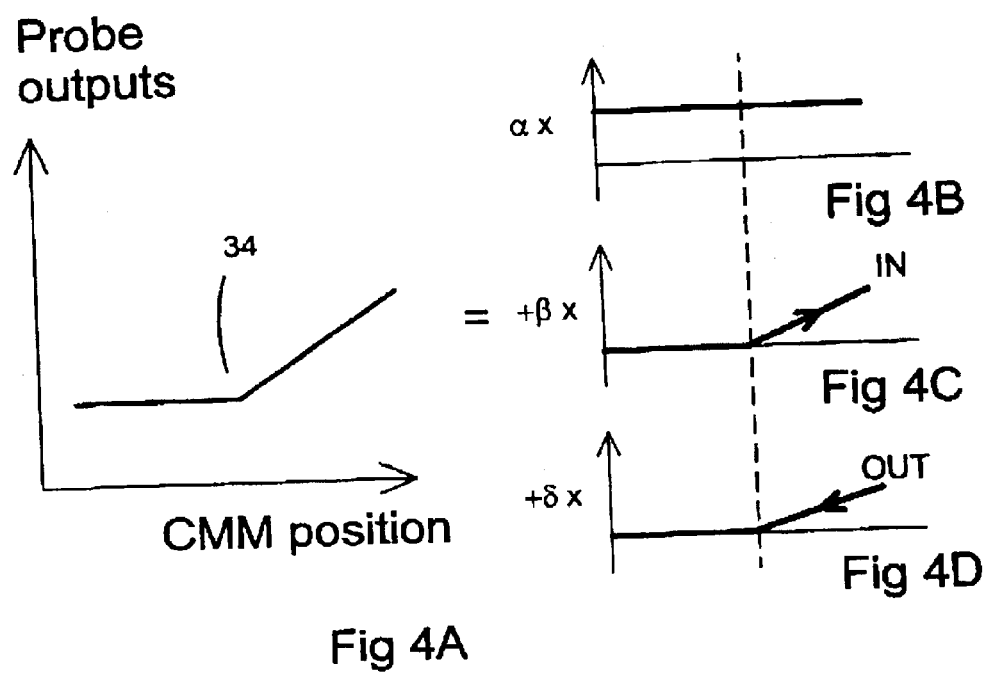
FIGS. 4A–4D illustrate the break line interpolation model of the second embodiment of the current invention.

As shown in FIG. 4A, the model comprises a break line 34 which is determined by a linear combination of two or more functions, a constant that fits tire free value of the probe (shown in FIG. 4B) and at least one sloped line that allow the mode to fit any corner. Each of the functions is multiplied by a parameter α, β and γ respectively. The sloped line shown in FIG. 4C fits the probe contact data in the forward direction and the sloped line shown in FIG. 4D fits the probe contact data in the reverse direction.

The sloped lines for the forwards and reverse directions shown in FIGS. 4C and 4D may have different gradients. This produces a better fit for the probe behaviour whilst it is in contact with the object.

The model must be fitted to the data and the contact point must be found. The model may be fitted to either one or both of the data collected in the forward and reverse directions (herein after referred to as the in-way and out-way data respectively). In a first step a possible contact point is chosen. The model is fitted to the data using the linear least squares method. The root mean square error of the fit (between the data and model) is then determined. This process is then repeated using a new possible contact point.

Figure 5:
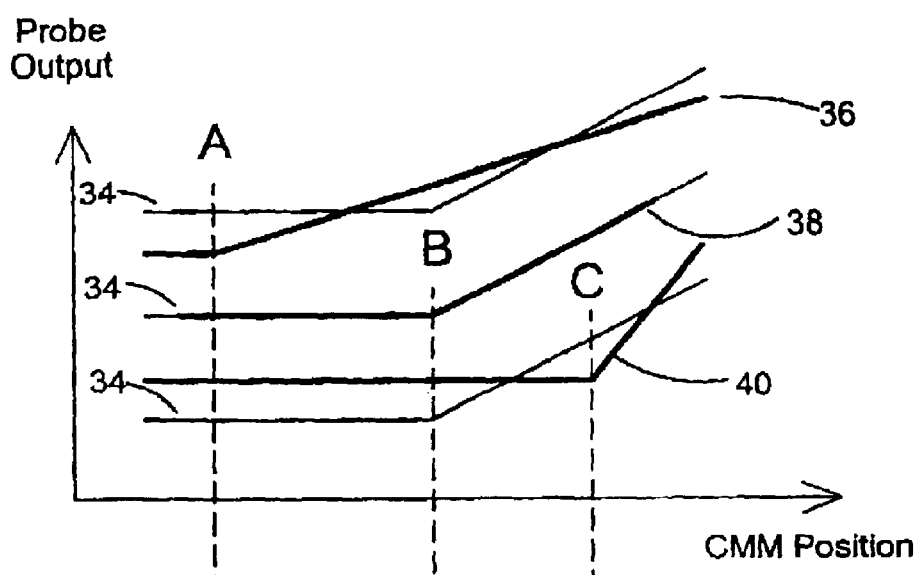
FIG. 5 illustrates the break line interpolation model fitted to measurement data.

FIG. 5 illustrates a graph of probe output against CMM position. Lines 36, 38 and 40 illustrate the model fitted to the data 34 three times, each with a different chosen contact point.

Figure 6:
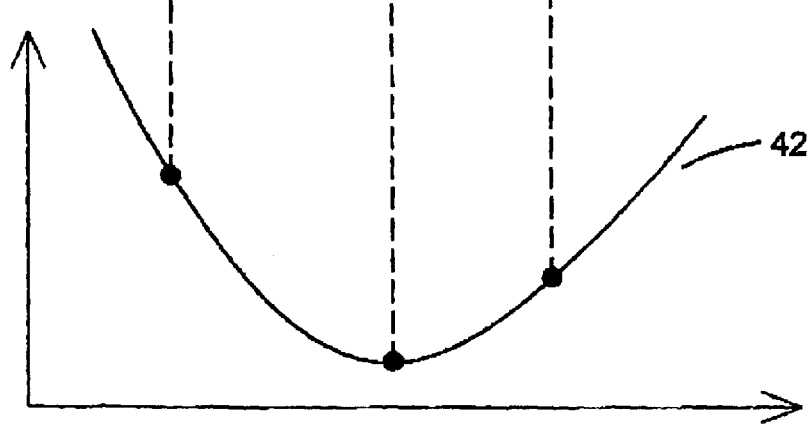
FIG. 6 is a graph of the root mean square error against contact position for each model shown in FIG. 5.

FIG. 6 illustrates a graph plotting the contact point position against the root mean square error between the measurement data and the corresponding model. A curve 42 is formed and the minimum of the curve (i.e. the minimum root mean square error) is the best possible fit between the data and model and therefore indicates the contact point position.

The minimum search can be done using a simple dichotomy method or a Newton method.

An advantage of using the break line model is that extrapolation of the measurement data to find the contact point is not required. Instead, the contact point is in the middle of the model.

As data is taken before and after the contact position, the present method performs an interpolation at the contact position instead of an extrapolation to probe output equals zero or free space value.

This method also has the advantage that as the probe deflection is determined at the contact point, both CMM position and stylus tip position are known at the contact instant. This differs from the extrapolated method described above in which the probe deflection is not known at the contact point, rather the position of the CMM is known when the probe deflection should be zero. This enables return to zero and hysteresis errors of the probe to be determined.

Figure 7A:
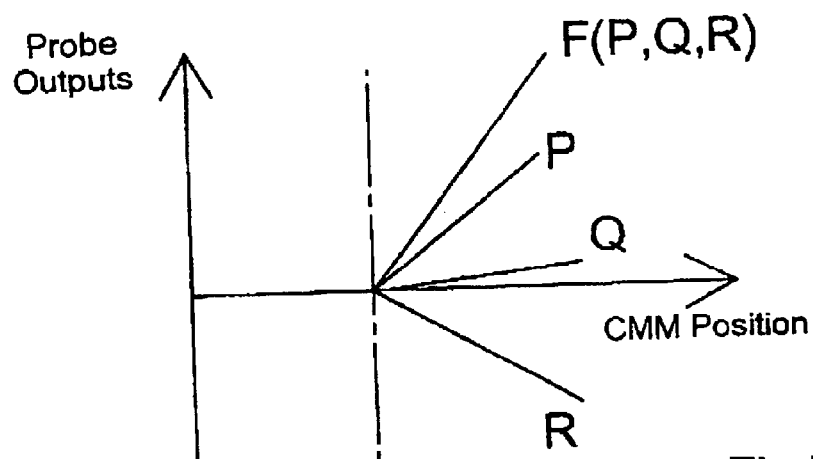
FIGS. 7A–7C are graphs of the individual probe outputs against CMM position.

The deflection of the stylus of the probe is measured by probe transducers. Typically there may be three probe transducers measuring deflection of the stylus in three orthogonal directions. The outputs of these transducers are denoted P, Q and R. The individual probe outputs P, Q and R may be computed and converted into a single dimension value F(P, Q, R) which shows variation of the probe outputs in any direction, as illustrated in FIG. 7a. For example, the single dimension value $F(P, Q, R) \cong |P|+|Q|+|R|$.

As previously described in the extrapolation method, the probe outputs are constant before the contact position and increase after the contact position. The gradient of the change in probe outputs against CMM position is determined by the direction in which the probe contacts the surface and the output gains after the contact position. By using the sum of the absolute values of each of the probe outputs, the direction in which the probe contacts the surface no longer effects this gradient. The contact point may be extrapolated from the probe output function F(P, Q, R) against CMM position.

However this is not a perfect solution. If the probe is not zeroed before extrapolating, the individual probe outputs may not equal zero before contact because of errors such as drift and return to zero which modify the probe offsets As the probe output function F(P, Q, R) is extrapolated to probe output=0, the zero point is the intersection between the slope of the probe output function F(P, Q, R) and the CMM position axis. However, the different offsets of the individual probe outputs can cause the zero point of the probe output function F(P, Q, R) to be calculated in the wrong position.

Furthermore, in a few directions of probing the sum of the individual probe outputs is zero. This can cause the sum of their absolute values F(P, Q, R) to give an erroneous contact point position.

Figure 7B:
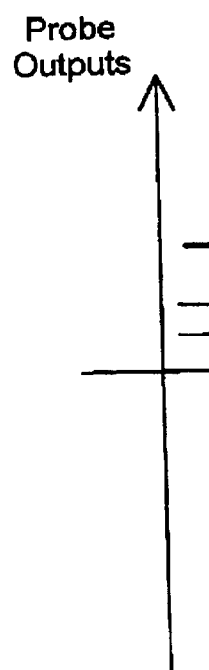
Figure 7C:
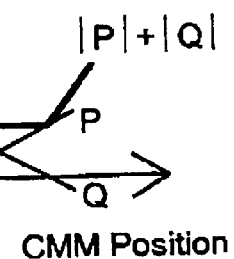

FIG. 7b illustrates a situation where the sum of the probe outputs is zero, which causes the sum of the absolute values F(P, Q, R) to give the wrong contact point. FIG. 7c illustrates a case where the probe is not zeroed before extrapolating and the wrong offsets of the probe outputs causes the calculated contact point to be incorrect.

These considerations effect other calculations involving P, Q and R, such as $\sqrt{P^2+Q^2+R^2}$.

Figure 8:
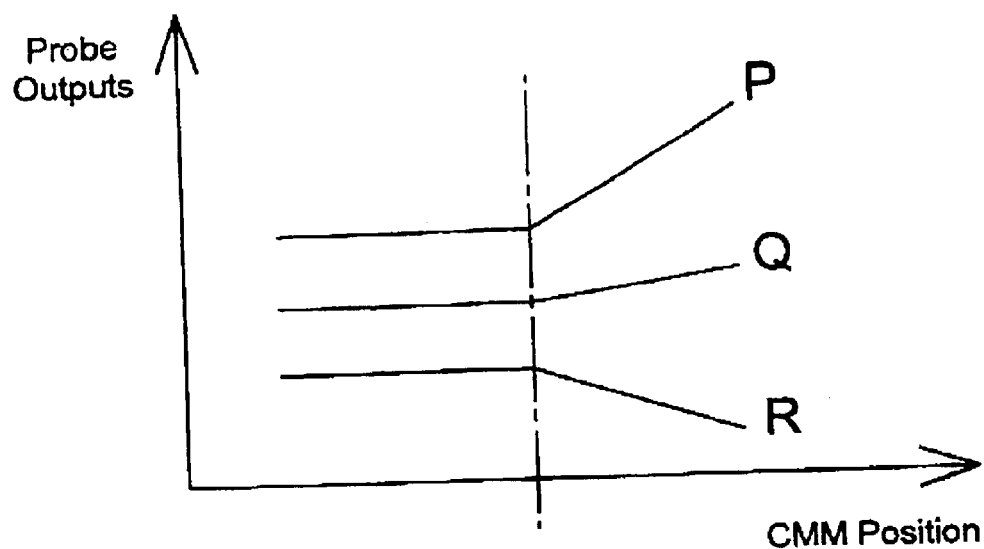
FIG. 8 illustrates the break line model being fitted to each probe output individually according to a single contact position.

These problems are overcome in the present invention by analysing each output separately. By using the data from each probe output P, Q and R, different probe offsets do not effect the final contact position. As illustrated in FIG. 8, the break line interpolation model is fitted to measurement data from each output P, Q and R individually to determine a single contact position. Thus if probe outputs P, Q and R differ, this does not give an error in the contact position. If there are differences in the contact positions determined using each probe output, the best contact position may be determined using an optimisation procedure.

Figure 2:
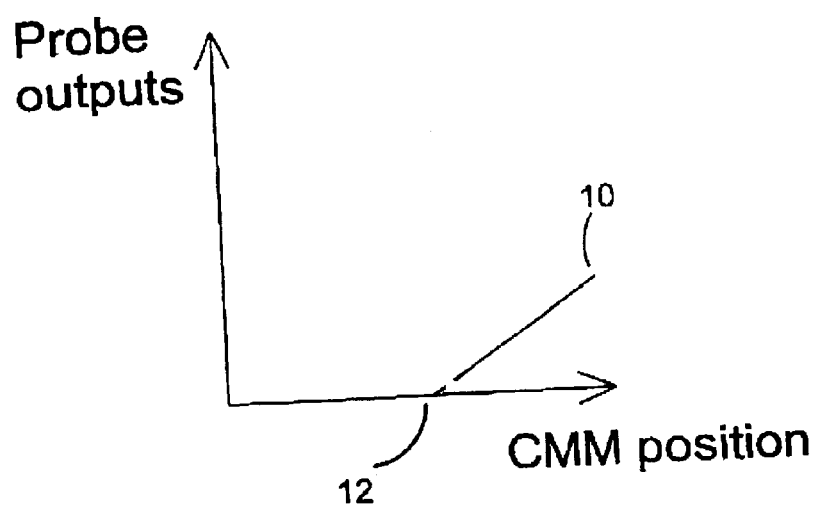
FIG. 2 is a graph of probe outputs against CMM position for a prior art method.

In the same manner, the separate probe outputs may be used individually to determine a single contact position in the extrapolation method of the prior art, as illustrated in FIG. 2.

The probe outputs may be effected by several types of errors, such as return to zero.

The probe may have a return to zero error. When a scanning probe takes a point measurement, the free position of the stylus before and after the probing are not necessarily the same. Part of the difference of the stylus position before and after probing is measured by the probe transducers and this is the return to zero error. The return to zero error may be due to the effect of probe dampers for example.

These errors can be observed in a repeatability test in which a surface is repeatably probed, with measurement data being collected both on the probe's forward and reverse movement from the surface. This surface is probed at the same position and along the same direction each time. This repeatability test allows the unidirectional repeatability of the probe to be tested.

Because of return to zero the position of the zero force contact point will change during the repeatability test as the history of probing influences these variations.

If data are taken during both in and out moves, the averaging of variations caused by errors such as return to zero reduce their effect and also enable the return to zero to be measured.

The difference in CMM position between the first in and the first out data is a measurement of the return to zero.

Therefore the return to zero of a probe can be determined from the first in and first out data of the CMM.

Components of the probe such as the electronics, filters, probe dampers and the stylus time response can cause a time delay between the stylus contacting the surface and the corresponding probe outputs. The present method of interpolating the break line model allows these errors due to time delays to be corrected.

Figure 9:
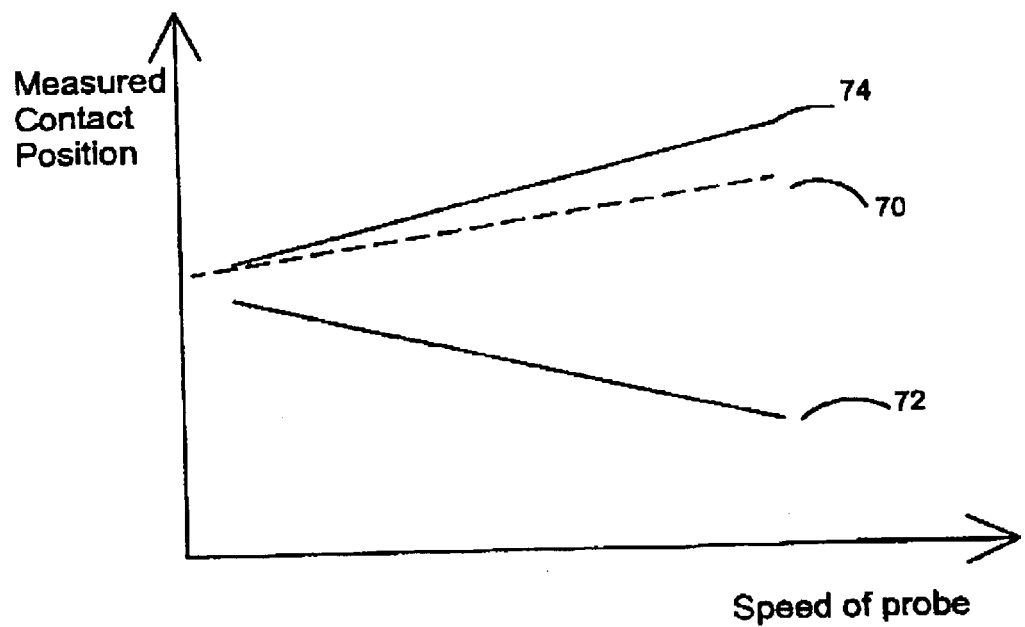
FIG. 9 is a graph of the measured position of the surface along the X axis against the speed of the probe.

The time delay may be observed by probing a surface in the same direction several times at different speeds. Probe data is collected both on the way in and the way out. FIG. 9 is a graph of the measured position of the surface along the X axis against the speed of the probe. Line 70 illustrates the measurements taken using the extrapolate to zero method of the prior art. It can be seen that as the speed of the probe movement increases, the measurement error increases.

Lines 72 and 74 illustrate the measurements taken using the break line interpolation model of the present invention taken on the way in and way out respectively. It can be seen that the measurements of lines 72 and 74 corresponding to the in and out measurements taken using the break line interpolation model have linear errors. As both the in and out errors are symmetrical, it appears that these errors are due to the time delay, the value of which can be determined from the gradients of the lines 72 and 74. The time delay occurs between the way in and way out measurements, and it is possible to identify the delay if measurements are taken both on the way in and the way out.

Figure 10:
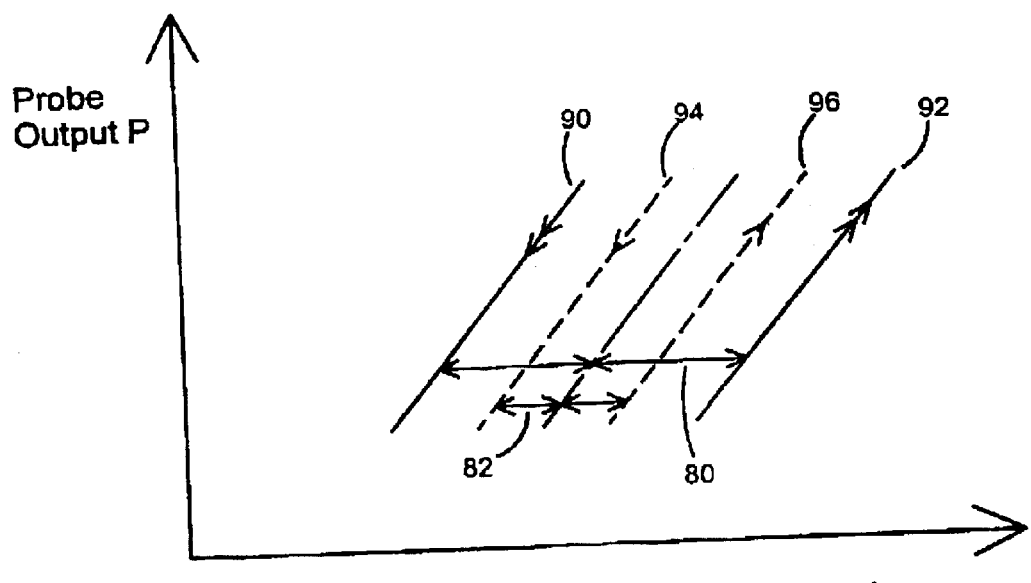
FIG. 10 illustrates the probe output P against CMM position, both on the way in and the way out at two different speeds.

FIG. 10 illustrates the probe output P against CMM X-axis position both on the way in and on the way out at two different speeds. Probe output P on the way in and probe output P on the way out at a faster speed are shown by lines 90, 92 respectively, whilst probe output P on the way in and probe output P on the way out at a slower speed are shown by dashed lines 94, 96 respectively. A time delay effect 80 can be observed between the way in and the way out measurements 90, 92 at the faster speed. As the probe is moved at constant speed, a constant delay is observed.

A second time delay effect 82 can be observed between the way in and way out measurements 94, 96 at the slower speed. The time delay can therefore be seen to increase as the probe speed increases.

The break line interpolation model can correct for the data acquisition delay described above. Use of the first contact point on the way out has the advantage that it allows single point measurement on the object without form error, However, the time delay must be corrected in order to obtain the correct contact position.

As discussed above, the time delay appears between the way in and way out data. Therefore it is possible to determine the value of the time delay if data is collected in both directions.

FIG. 11 shows the break line model with a time delay line added, The two sloped lines are the way in 90 and way out 94 measurement data taken whilst the stylus is in contact with the surface. The CMM contact point calculated using the way out measurement data is represented by T. The time delay between in and out lines is shown as dT. Where the in-way and out-way speeds are the same, the way out contact position corrected for time delay errors is T+dT/2. However where the in-way and out-way speeds are not the same, the term dT/2 is replaced by a weighted average of the in-way and out-way speeds.

This delay identification optimises two variables T and dT using Newton multivariate minimisation method.

Figure 12:
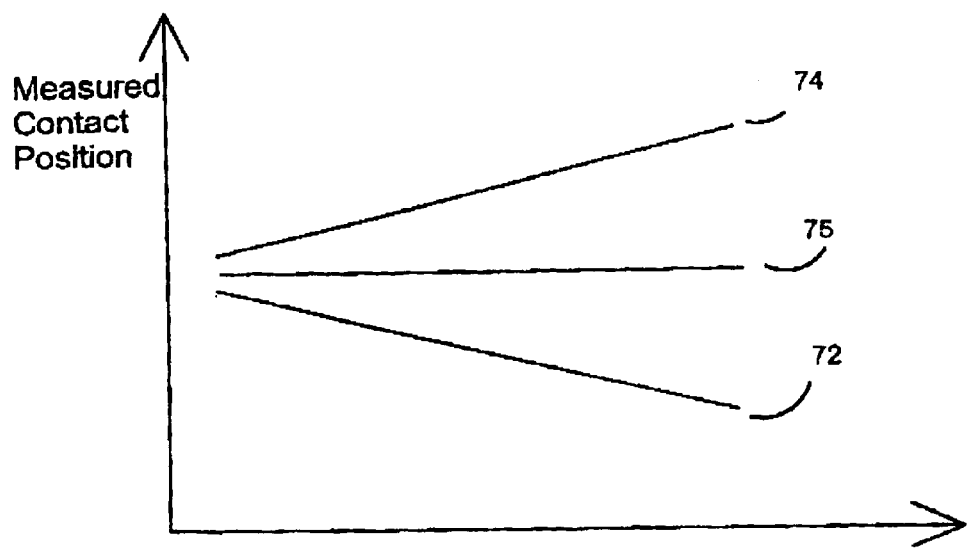
FIG. 12 illustrates the graph of FIG. 12 showing the correction for the time delay.

Line 75 on FIG. 12 illustrates the performance of this break line interpolation with delay compensation.

The contact interpolated point with delay identification has no slope error against speed of CMM, meaning that the time delay is corrected by this identification method.

This method of delay correction is also suitable for use with the extrapolation method shown in FIG. 2.

This method of correction for time delay is also suitable for use with a non-contact probe, for example an optical probe, in which time delays may be caused by, for example, processing delays. In this case, the apparent surface position of the object is measured both as the non-contact probes moves towards and away from the object. As above, the corrected surface position is determined by taking an average of the two apparent surface positions, the average being weighted by the speed of the machine in each direction.

It is also possible to collect the data in both directions and fit the break line model to this data to determine a single contact position. This has the effect of averaging the differences in the data collected in both directions. Likewise the data collected in both directions may be extrapolated to find a single contact position, using the method of the prior art.

What is claimed is:

1. A method of measuring an artefact using a machine on which a measuring probe is mounted for relative movement with respect to the artefact, said machine having at least one measuring device for providing an output indicative of the relative position of the probe, the probe having a deflectable stylus, and at least one measuring device for measuring deflections of the stylus to provide one or more probe outputs which are indicative of the amount of deflection of the stylus from a rest position, the method being characterised by the steps of:

causing relative movement between the probe and artefact to bring the stylus into contact with the surface of an artefact and continuing said movement for a limited distance after initial contact has been made between the stylus and the artefact;

recording the outputs of the machine and of the probe at a plurality of instants, during both the periods of contact and non contact between the stylus and the artefact;

providing a model of the probe and CMM outputs which models the outputs both during contact and non contact between the stylus and the artefact;

fitting the model to the data and thereby determining the values of the outputs of the measuring device or devices of the machine relating to the contact position at which the stylus contacts the artefact with zero contact force; and combining said outputs of the measuring device or devices of the machine at said contact position with the probe deflection at the contact instant to establish the contact position at zero force.

2. A method according to claim 1 wherein the outputs of the measuring devices of the machine and the probe are recorded during one or both of the probes relative movement towards the artefact and away from the artefact.

3. A method according to claim 1 wherein the model comprises a break line.

4. A method according to claim 3 wherein the break line comprises a linear combination of two or more functions.

5. A method according to claim 4 wherein a first function comprises a line of zero gradient and a second function comprises a sloped line.

6. A method according to claim 1 wherein the value of the outputs of the machine when the stylus contacts the artefact with zero contact force are determined by an optimisation procedure.

7. A method according to claim 1 wherein deflections of the stylus provides at least two probe outputs relating to at least two probe axes and wherein the data from each probe output is used individually to determine a single contact position.

8. A method according to claim 1 wherein the machine has three measuring devices to measure the relative position of the probe in three orthogonal directions.

9. A method according to claim 1 wherein the probe has three measuring devices to measure the deflection of the stylus in three orthogonal directions.

10. A method of measuring an artefact using a machine on which a measuring probe is mounted for relative movement with respect to the artefact, said machine having at least one measuring device for providing an output indicative of the relative position of the probe, the probe having a deflectable stylus and at least one measuring device for measuring deflections of the stylus to provide two or more probe outputs which are indicative of the amount of deflection of the stylus from a rest position along at least two probe axes, the method including the steps of:

causing relative movement between the probe and artefact to bring the stylus into contact with the artefact and continuing said movement for a limited distance after initial contact has been made between the stylus and the artefact;

recording the outputs of the machine and of the probe at a plurality of instants, in at least part of the period of contact between the stylus and the artefact;

from said outputs of the machine and of the probe, determining the values of the outputs of the machine relating to the contact position when the stylus contacts the artefact with zero contact force;

wherein the data from each probe output is used individually to determine a single contact position.

11. A method of measuring an artefact according to claim 10 wherein an optimisation procedure is used to determine the single contact position from each individual probe output.

12. A method of measuring an artefact using a machine on which a measuring probe is mounted for relative movement with respect to the artefact, said machine having at least one measuring device for providing an output indicative of the relative position of the probe, the probe having a deflectable stylus and at least one measuring device for measuring deflections of the stylus to provide two or more probe outputs which are indicative of the amount of deflection of the stylus from a rest position, the method including the steps of:
- causing relative movement between the probe and artefact to bring the stylus into contact with the artefact and continuing said movement for a limited distance after initial contact has been made between the stylus and the artefact;
- recording the outputs of the machine and of the probe at a plurality of instants, in at least part of the period of contact between the stylus and the artefact, both for relative movement between the probe and artefact towards and away from one another;
- from said outputs of the machine and of the probe both for relative movement between the probe and artefact towards and away from one another, determining the values of the outputs of the machine relating to the contact position when the stylus contacts the artefact with zero contact force.

13. A method of measuring an artefact using a machine on which a measuring probe is mounted for relative movement with respect to the artefact, said machine having at least one measuring device for providing an output indicative of the relative position of the probe, the probe having a deflectable stylus and at least one measuring device for measuring deflections of the stylus to provide one or more probe outputs which are indicative of the amount of deflection of the stylus from a rest position, the method including the steps of:
- causing relative movement between the probe and the artefact to bring the stylus into contact with the artefact and continuing said movement for a limited distance after initial contact has been made between the stylus and the artefact;
- recording the outputs of the machine and of the probe at a plurality of instants, in at least part of the period of contact between the stylus and the artefact, both for relative movement between the probe and artefact towards and away from one another;
- from said outputs of the machine and of the probe, determining the values of the outputs of the machine relating to the contact position when the stylus contacts the artefact with zero contact force, both for relative movement between the probe and artefact towards and away from one another, thereby determining two apparent contact positions;
- and wherein the true contact position is determined by combining the two apparent contact positions.

14. A method according to claim 13 wherein the combination of the two apparent contact positions comprises taking an average of the two apparent contact positions.

15. A method according to claim 14 wherein the average is weighted by the relative speeds of the machine during the relative movement between the probe and artefact in each direction.

16. A method according to claim 13 wherein the speeds of the machine during the relative movement in between the probe and artefact in each direction is the same.

17. A method of measuring an artefact using a machine on which a measuring probe is mounted for relative movement with respect to the artefact, said machine having at least one measuring device for providing an output indicative of the relative position of the probe, the probe having at least one measuring device for providing one or more probe outputs indicative of the distance of the probe form a surface, the method including the steps of:
- causing relative movement between the probe and artefact;
- recording the outputs of the machine and of the probe at a plurality of instants, both for relative movement between the probe and artefact towards and away from one another;
- from said outputs of the machine and of the probe both for relative movement between the probe and the artefact towards and away from one another, determining the surface positions of a surface of the artefact.

18. A method of measuring an artefact using a machine on which a measuring probe is mounted for relative movement with respect to the artefact, said machine having at least one measuring device for providing an output indicative of the relative position of the probe, the probe having at least one measuring device for providing one or more probe outputs indicative of the distance of the probe from a surface, the method including the steps of:
- causing relative movement between the probe and the artefact;
- recording the outputs of the machine and of the probe at a plurality of instants, both for relative movement between the probe and artefact towards and away from one another;
- from said outputs of the machine and of the probe, determining two apparent surface positions of a surface of the artefact, the two apparent surface positions relating to relative movement between the probe and artefact towards and away from one another respectively;
- and wherein the true surface position is determined by combining the two apparent surface positions.

19. A method according to claim 18 wherein the combination of the two apparent surface positions comprises taking an average of the two apparent surface positions.

20. A method according to claim 19 wherein the average is weighted by the relative speeds of the machine during the relative movement between the probe and artefact in each direction.

21. A method according to claim 18 wherein the probe is a non contact probe.

22. A computer program for use with apparatus for measuring the dimensions of an artefact, the apparatus comprising a measuring probe mounted on a machine for relative movement with respect to the artefact, the machine having at least one measuring device for providing an output indicative of the relative position of the probe, the probe having a deflectable stylus, and at least one measuring device for measuring deflections of the stylus to provide one or more probe outputs which are indicative of the amount of deflection of the stylus from a rest position, the computer program causing the following steps:
- producing relative movement between the probe and artefact to bring the stylus into contact with the surface of an artefact and continuing said movement for a limited distance after initial contact has been made between the stylus and the artefact;
- recording the outputs of the machine and of the probe at a plurality of instants, during both the periods of contact and non contact between the stylus and the artefact;

providing a model of the probe and CMM outputs which models the outputs both during contact and non contact between the stylus and the artefact;

fitting the model to the data and thereby determining the values of the outputs of the measuring device or devices of the machine relating to the contact position at which the stylus contacts the artefact with zero contact force; and combining said outputs of the measuring device or devices of the machine at said contact position with the probe deflection at the contact instant to establish the contact position at zero force.

23. A computer program according to claim 22 wherein the outputs of the measuring devices of the machine and the probe are recorded during one or both of the probes relative movement towards the artefact and away from the artefact.

24. A computer program according to claim 22 wherein the model comprises a break line.

25. A computer program according to claim 24 wherein the break line comprises a linear combination of two or more functions.

26. A computer program according to claim 25 wherein a first function comprises a line of zero gradient and a second function comprises a sloped line.

27. A computer program according to claim 22 wherein the value of the outputs of the machine when the stylus contacts the artefact with zero contact force are determined by an optimisation procedure.

28. A computer program according to claim 22 wherein deflections of the stylus provides at least two probe outputs relating to at least two probe axes and wherein the data from each probe output is used individually to determine a single contact position.

29. A computer program for use with apparatus for measuring the dimensions of an artefact, the apparatus comprising a measuring probe mounted on a machine for relative movement with respect to the artefact, the machine having at least one measuring device for providing an output indicative of the relative position of the probe, the probe having a deflectable stylus and at least one measuring device for measuring deflections of the stylus to provide two or more probe outputs which are indicative of the amount of deflection of the stylus from a rest position along at least two probe axes the computer program causing the following steps:

producing relative movement between the probe and artefact to bring the stylus into contact with the artefact and continuing said movement for a limited distance after initial contact has been made between the stylus and the artefact;

recording the outputs of the machine and of the probe at a plurality of instants, in at least part of the period of contact between the stylus and the artefact;

from said outputs of the machine and of the probe, determining the values of the outputs of the machine relating to the contact position when the stylus contacts the artefact with zero contact force;

wherein the data from each probe output is used individually to determine a single contact position.

30. A computer program according to claim 29 wherein an optimisation procedure is used to determine the single contact position from each individual probe output.

31. A computer program for use with apparatus for measuring the dimensions of an artefact, the apparatus comprising a measuring probe mounted on the machine for relative movement with respect to the artefact, the machine having at least one measuring device for providing an output indicative of the relative position of the probe, the probe having a deflectable stylus and at least one measuring device for measuring deflections of the stylus to provide two or more probe outputs which are indicative of the amount of deflection of the stylus from a rest position, the computer program causing the following steps of:

producing relative movement between the probe and artefact to bring the stylus into contact with the artefact and continuing said movement for a limited distance after initial contact has been made between the stylus and the artefact;

recording the outputs of the machine and of the probe at a plurality of instants, in at least part of the period of contact between the stylus and the artefact, both for relative movement between the probe and artefact towards and away from one another;

from said outputs of the machine and of the probe determining the values of the outputs of the machine relating to the contact position when the stylus contacts the artefact with zero contact force, both for relative movement between the probe and artefact towards and away from one another, thereby determining two apparatus contact positions;

and wherein the true contact position is determined by combining the two apparent contact positions.

32. A computer program according to claim 31 wherein the combination of the two apparent contact positions comprises taking an average of the two apparent contact positions.

33. A computer program according to claim 32 wherein the average is weighted by the relative speeds of the machine during the relative movement between the probe and artefact in each direction.

34. A computer program according to claim 31 wherein the speeds of the machine during the relative movement in between the probe and artefact in each direction is the same.

35. A computer program for use with apparatus for measuring the dimensions of an artefact, the apparatus comprising a measuring probe mounted on a machine for relative movement with respect to the artefact, the machine having at least one measuring device for providing an output indicative of the relative position of the probe, the probe having one measuring device for providing one or more probe outputs indicating of the distance of the probe from a surface, the computer program causing the following steps:

producing relative movement between the probe and the artefact;

recording the outputs of the machine and of the probe at a plurality of instants, both for relative movement between the probe and artefact towards and away from one another;

from said outputs of the machine and of the probe, determining two apparent surface positions of a surface of the artefact, the two apparent surface positions relating to relative movement between the probe and artefact towards and away from one another, respectively;

and wherein the true surface position is determined by combining the two apparent surface positions.

36. A computer program according to claim 35 wherein the combination of the two apparent surface positions comprises taking an average of the two apparent surface positions.

37. A computer program according to claim 36 wherein the average is weighted by the relative speeds of the machine during the relative movement between the probe and artefact in each direction.

38. A computer program according to claim 35 wherein the probe is a non contact probe.

39. A computer program for use with apparatus for measuring the dimensions of an artefact, the apparatus comprising a measuring probe mounted on the machine for relative movement with respect to the artefact, the machine having at least one measuring device for providing an output indicative of the relative position of the probe, the probe having a deflectable stylus and at least one measuring device for measuring deflections of the stylus to provide two or more probe outputs which are indicative of the amount of deflection of the stylus from a rest position, the computer program causing the following steps of:

producing relative movement between the probe and artefact to bring the stylus into contact with the artefact and continuing said movement for a limited distance after initial contact has been made between the stylus and the artefact;

recording the outputs of the machine and of the probe at a plurality of instants, in at least part of the period of contact between the stylus and the artefact, both for relative movement between the probe and artefact towards and away from one another;

from said outputs of the machine and of the probe, both for relative movement between the probe and the artefact towards and away from one another, determining the values of the outputs of the machine relating to the contact position when the stylus contacts the artefact with zero contact force.

40. A computer program for use with apparatus for measuring the dimensions of an artefact, the apparatus comprising a measuring probe mounted on a machine for relative movement with respect to the artefact, the machine having at least one measuring device for providing an output indicative of the relative position of the probe, the probe having one measuring device for providing one or more probe outputs indicating of the distance of the probe from a surface, the computer program causing the following steps:

producing relative movement between the probe and the artefact;

recording the outputs of the machine and of the probe at a plurality of instants, both for relative movement between the probe and artefact towards and away from one another;

from said outputs of the machine and of the probe, both for relative movement between the probe and the artefact towards and away from one another, determining the surface position of a surface of the artefact.

* * * * *